United States Patent [19]

Mochizuki

[11] Patent Number: 5,893,647
[45] Date of Patent: Apr. 13, 1999

[54] BEARING RETAINER FOR A SLIDING MECHANISM FOR USE IN A MACHINE TOOL

[75] Inventor: Masanori Mochizuki, Yao, Japan

[73] Assignee: Isel Co., Ltd., Osaka, Japan

[21] Appl. No.: 08/971,950

[22] Filed: Nov. 17, 1997

Related U.S. Application Data

[63] Continuation-in-part of application No. 08/816,361, Mar. 13, 1997, abandoned.

Foreign Application Priority Data

Mar. 15, 1996 [JP] Japan .................... 8-059172

[51] Int. Cl.$^6$ .................... F16C 29/04
[52] U.S. Cl. .................... 384/51
[58] Field of Search .................... 384/51, 49, 50, 384/53, 48

[56] References Cited

U.S. PATENT DOCUMENTS

| | | | |
|---|---|---|---|
| 3,582,161 | 6/1971 | Hudson . | |
| 4,664,534 | 5/1987 | Hanaway | 384/49 |
| 5,033,878 | 7/1991 | Tsuji et al. | 384/576 |
| 5,345,679 | 9/1994 | Lennon et al. | 29/898.055 |

FOREIGN PATENT DOCUMENTS

| | | |
|---|---|---|
| 62-75128 | 4/1987 | Japan . |
| 3-81035 | 4/1991 | Japan . |
| 2 177 165 | 1/1987 | United Kingdom . |

*Primary Examiner*—Lenard A. Footland
*Attorney, Agent, or Firm*—Sidley & Austin; Hugh A. Abrams

[57] ABSTRACT

This invention provides a bearing retainer for a sliding mechanism for use in a machine tool, especially a press. The bearing retainer has a tubular or generally cylindrical retainer body. The retainer body has a plurality of supporting holes to support rollers. Tongue-like portions are formed at the edge portions of each supporting hole for preventing a roller from falling out of the supporting hole. Cavities are provided between the adjacent supporting holes. Each cavity permits the edge portion including the tongue-like portion to deform elastically in the direction that the aperture of each supporting hole will be enlarged on the outer side surface of the retainer body. Thus, when the outer mold has moved away from the inner mold during the injection molding process of the retainer the retainer can be obtained from a mold set without cracking or breaking the tongue-like portion of the retainer. In this way, the tongue-like portion can be molded on the outer side surface of the retainer by injection molding process. As a result of this, caulking process for forming the tongue-like portion is not required and manufacturing cost can be reduced.

5 Claims, 13 Drawing Sheets

BEARING RETAINER FOR A SLIDING MECHANISM FOR USE IN A MACHINE TOOL

This is a continuation-in-part of Ser. No. 08/816,361 filed Mar. 13, 1997, abandoned.

BACKGROUND OF THE INVENTION

The present invention relates to a bearing retainer for use in a sliding mechanism of a machine tool, particularly a press.

A die-set is generally used to improve precision in press working, such as punching or bending. The die-set includes a punch holder to hold a punch, a die holder facing the punch holder to hold a die and a guide-post as a sliding mechanism which slidably supports each holder. The guide-post includes a longitudinally extending post, a sleeve slidably received outside the post and a bearing inserted between the post and the sleeve.

As shown in FIG. 12, a conventional bearing 100 for a guide-post includes a generally cylindrical retainer 101 and a plurality of balls 102 received in the retainer 101. Each ball 102 is rotatably received in each hole 103 formed in the retainer 101.

Each hole 103 of the retainer 101 is formed by drilling a pipe. A drilled hole 103, as shown in FIG. 13A, has a tongue-like portion 105 protruding inwardly from the edge of the hole 103 on the inner side surface 101a of the retainer 101. The ball 102 is then inserted into the hole 103 from the outer side surface 101b of the retainer 101.

After the ball 102 is inserted into the hole 103 a caulking tool 110 is pressed around the adjacent part of the edge of the hole 103 on the outer side surface 101b of the retainer 101. As a result of this caulking, as shown in FIG. 13B, a tongue-like portion 107 similar to the tongue-like portion 105 is formed around the edge of the hole 103 on the outer side surface 101b of the retainer 101. These tongue-like portions 105, 107 hold the ball 102 inside the hole 103 and prevent the ball 102 from dropping out of the hole 103.

As described above, caulking process as well as drilling process is required in manufacturing a prior art bearing retainer for use in the guide-post of the die-set. This increases the manufacturing cost of the bearing retainer.

It is the primary object of the present invention to provide a bearing retainer for use in a sliding mechanism of a machine tool, particularly a press, which can decrease the manufacturing cost.

SUMMARY OF THE INVENTION

This invention is directed to a bearing retainer for use in a sliding mechanism of a machine tool, particularly a press.

The bearing retainer includes a generally cylindrical or tubular retainer body formed by injection molding. The retainer body has a plurality of longitudinally extending flat portions and it has a polygonal shape in cross section. A plurality of holes for receiving rollers are formed in the flat portions of the retainer body.

Tongue-like portions are formed at the upper and lower edge portions of the holes on the outer and inner side surfaces of the retainer body to prevent the rollers from dropping out. In addition, there are provided cavities between the adjacent holes on each of the flat portions on the outer side surfaces of the retainer body. The cavities are adapted to permit the edge portions of the holes on the outer side surface of the retainer body to elastically deform toward the cavities. Thus, the cavities prevent the edge portions of the holes and therefore the retainer body itself from cracking or breaking when an outer mold moves away from an inner mold after injection molding.

In such a manner, it is possible to mold the tongue-like portions by injection molding at the edge of the holes on the outer side surface of the retainer body. The bearing retainer of the present invention does not require the caulking process for forming the tongue-like portions, and this decreases the manufacturing cost.

Additionally, the bearing retainer of the present invention can be formed using foamed resin, especially foamed resin of continuously connected foam, as well as non-foamed resin. When the bearing retainer is molded using foamed resin, multiple small holes are formed inside the bearing retainer and the lubricant can soak into these holes. Thus, the wear to the bearing retainer and the roller contact surfaces can be decreased.

The foregoing and other features and advantages of the present invention will become apparent from the following detailed description of the presently preferred embodiments and the accompanying drawings.

DETAILED DESCRIPTION OF THE PREFERRED EMBODIMENTS

Figure 1:
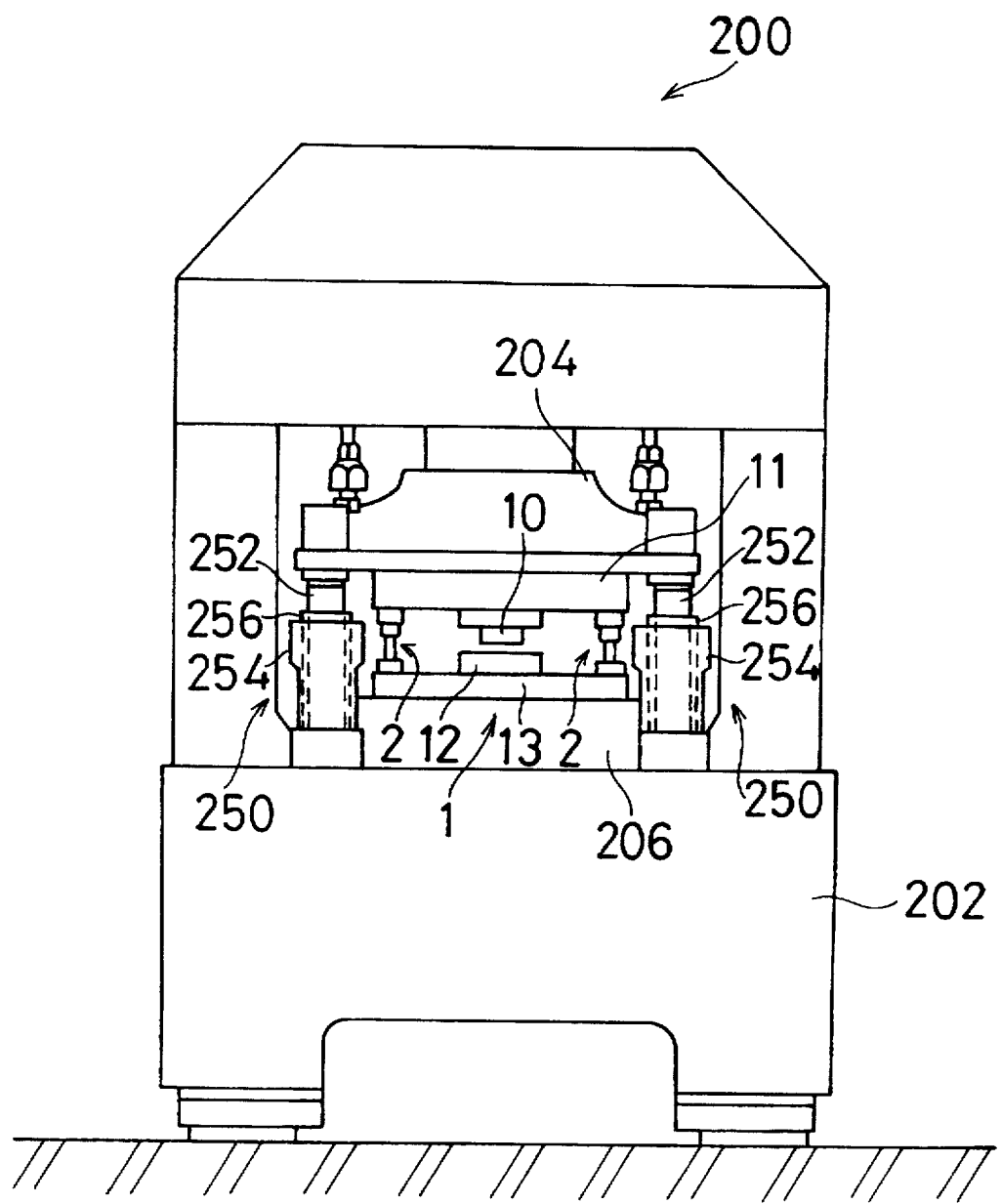
FIG. 1 is a front view of a press having a sliding mechanism wherein a bearing retainer of the present invention is employed.

Turning now to the drawings, FIG. 1 shows a press having a sliding mechanism where a bearing retainer of the present invention is employed.

The press 200 includes a ram 204 provided movably up and down by a driving mechanism (not shown) over a bed 202. A base block 206 is fixed on the bed 202.

Figure 2:
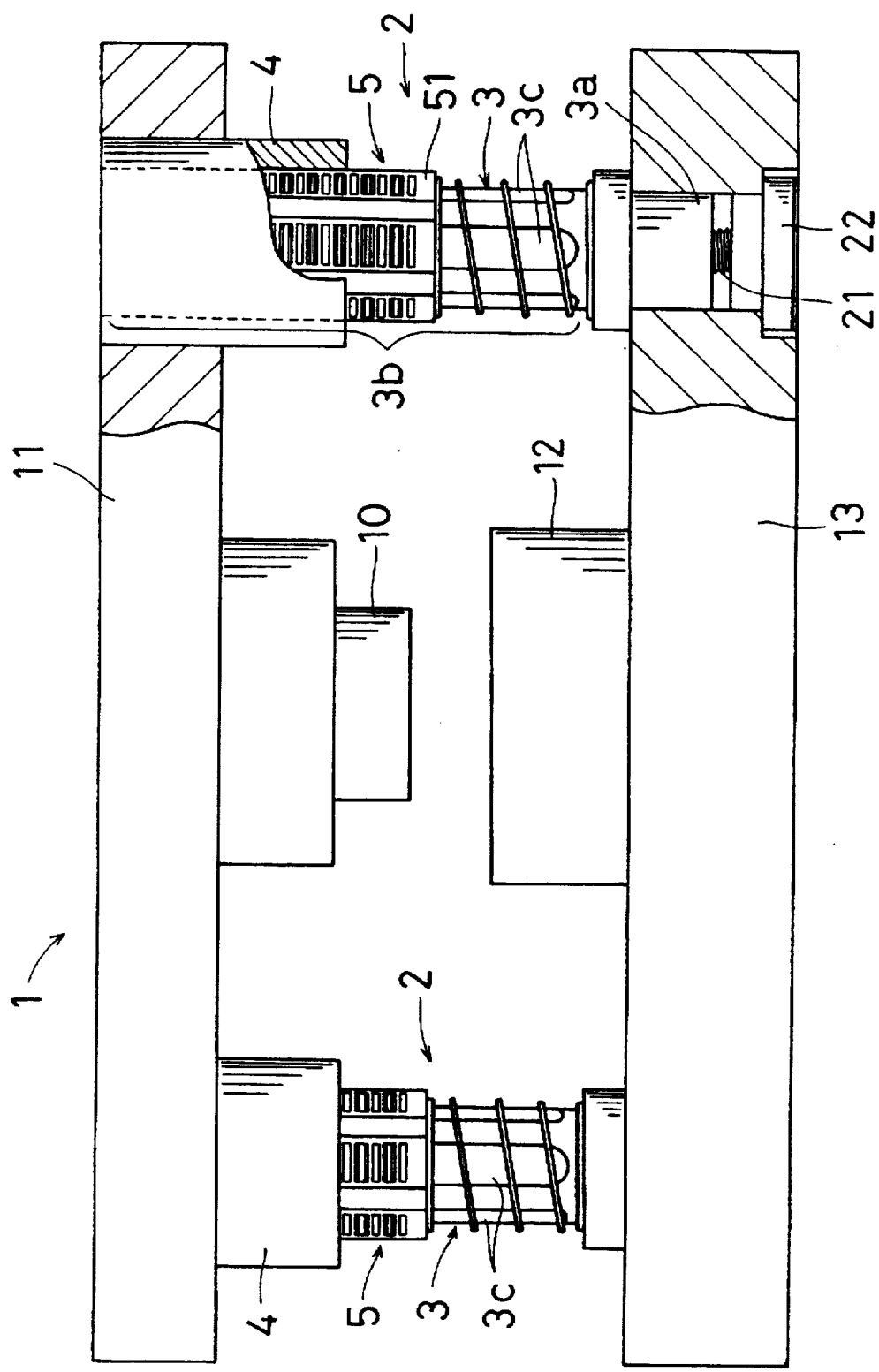
FIG. 2 is a front elevation view of a die-set which incorporates a guide-post including a bearing retainer of the present invention.

A die-set 1 is disposed between the ram 204 and the base block 206. As shown in FIG. 2, the die-set 1 includes a punch holder 11 to hold a punch 10, a die holder 13 facing the punch holder 11 to hold a die 12 and a guide-post 2 as a sliding mechanism which slidably supports the holders 11 and 13.

The punch holder 11 is fixed on the bottom surface of the ram 204 and the die holder 13 is fixed on the top surface of the base block 206. The guide-post 2 includes a longitudinally extending post 3, a sleeve 4 slidably received outside the post 3 and a roller bearing 5 inserted between the post 3 and the sleeve 4.

The lower portion 3a of the post 3 is fixed into the die holder 13 with a fastening bolt 21 and a cap member 22. The outside portion 3b of the post 3 has six flat portions 3c each of which extends longitudinally and the outside portion 3b has a generally hexagonal shape in cross section. The outside portion 3b is not limited to the hexagonal shape and it may be generally octagonal or shaped differently in cross section. The upper portion of the sleeve 4 is inserted and fixed into the punch holder 11.

Alternatively, the post 3 may be fixed into the punch holder 11 and the sleeve 4 may be fixed into the die holder 13.

Figure 3:
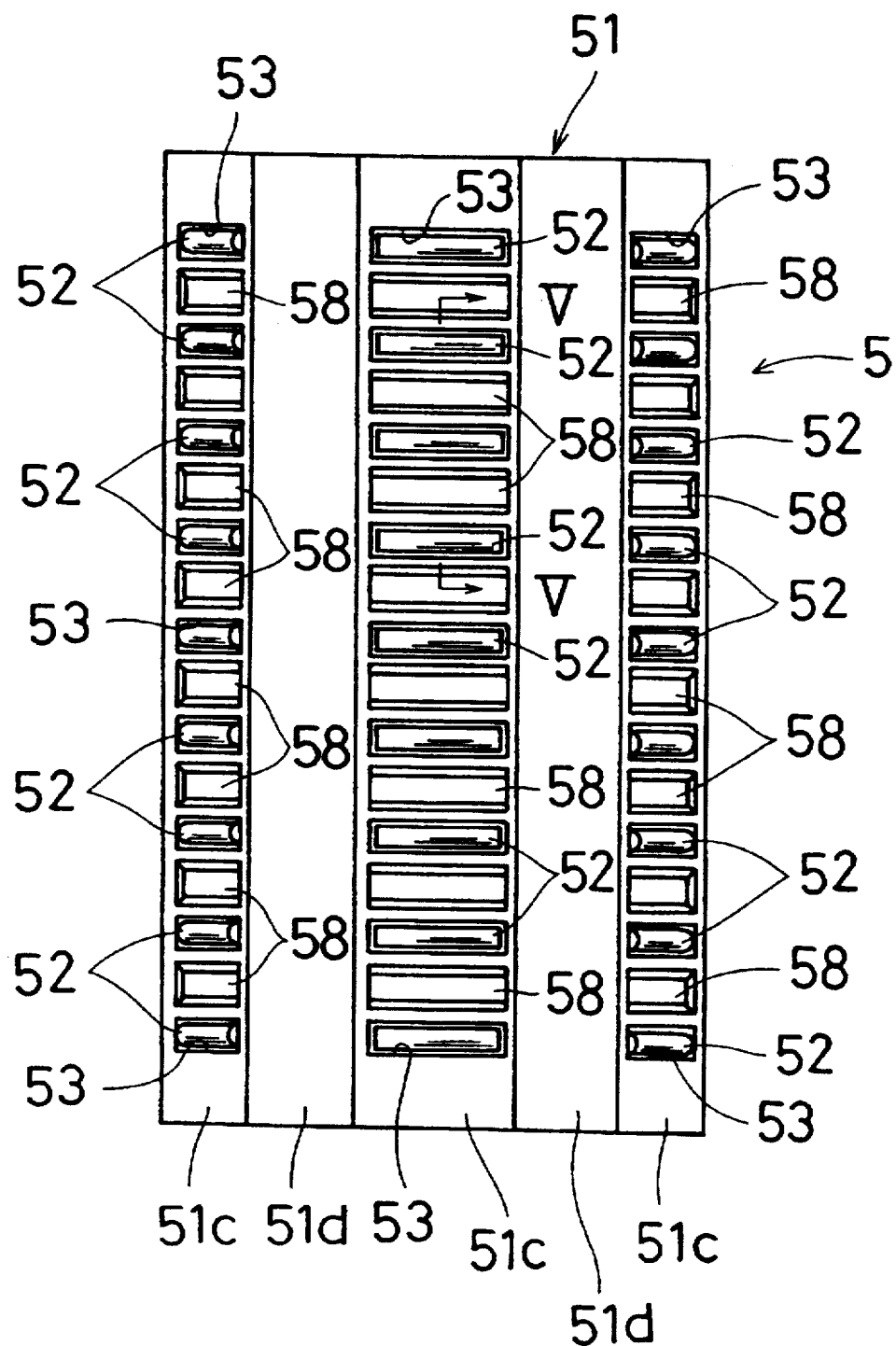
FIG. 3 is a front elevation view of a bearing retainer of the preferred embodiment of the present invention.
Figure 4:
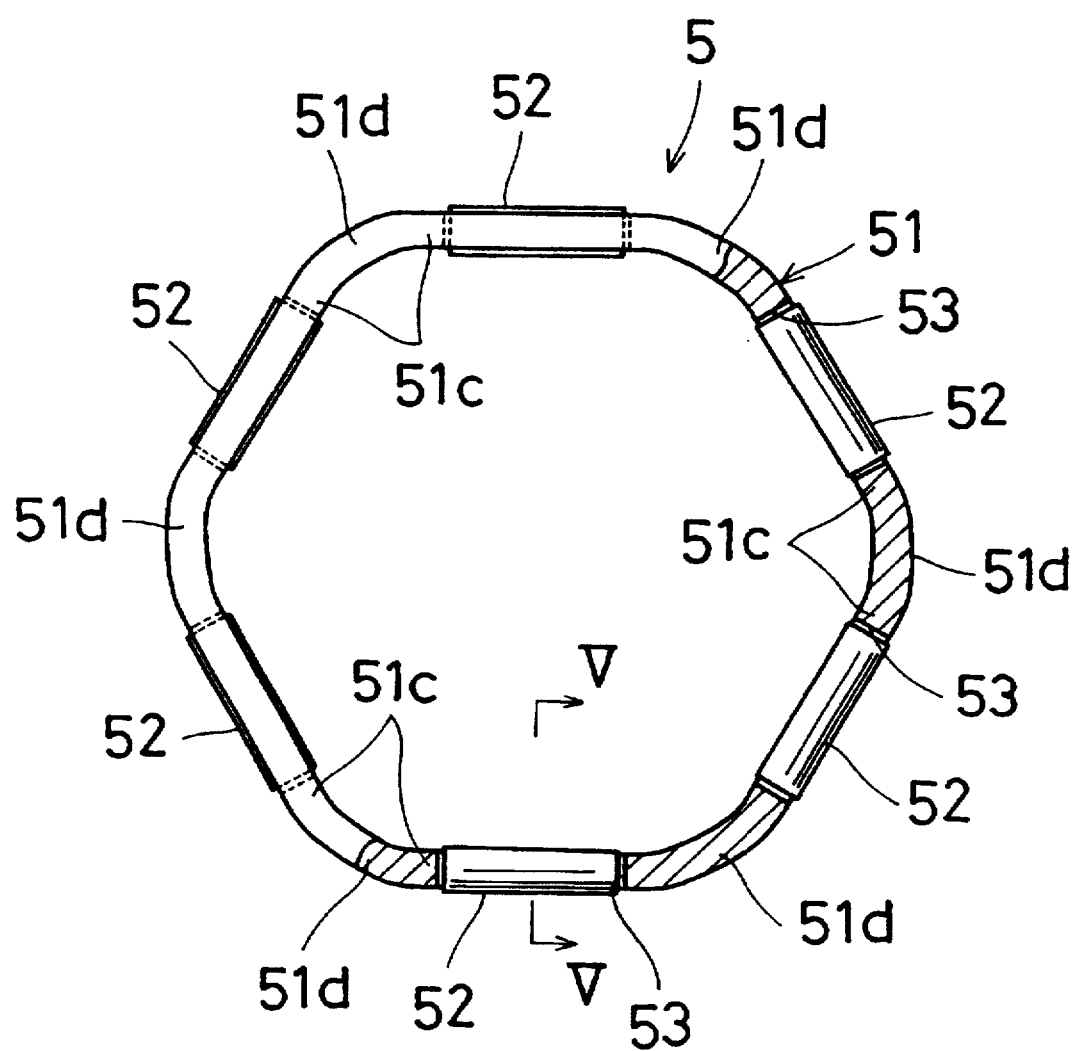
FIG. 4 is a top plan view of a bearing retainer of the preferred embodiment of the present invention.

As shown in FIGS. 3 and 4, the roller bearing 5 includes a generally cylindrical (or tubular) retainer 51 and a plurality of needle-like rollers 52 which are supported in the retainer 51.

The retainer 51 has six flat portions 51c each of which extends longitudinally and the retainer 51 has a generally hexagonal shape in cross section (see FIG. 4). Adjacent flat portions 51c are connected by a curved or flat portion 51d which also extends longitudinally. Each solid or hollow roller 52 is cylindrical and rotatably received in each supporting hole 53 which is disposed along the flat portions 51c.

Figure 5:
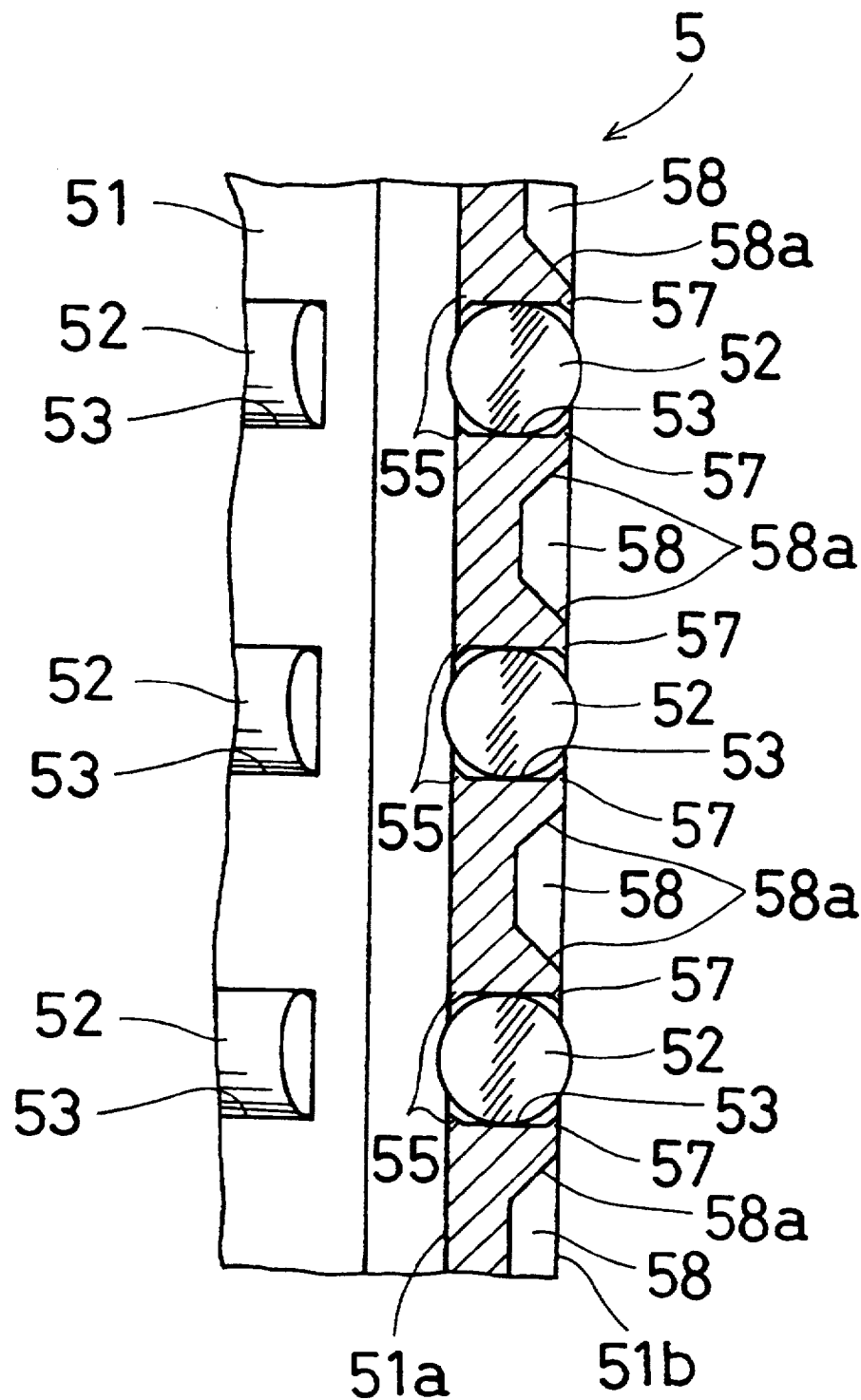
FIG. 5 is a sectional view of a bearing retainer of FIGS. 3 and 4 taken along line V—V.
Figure 6:
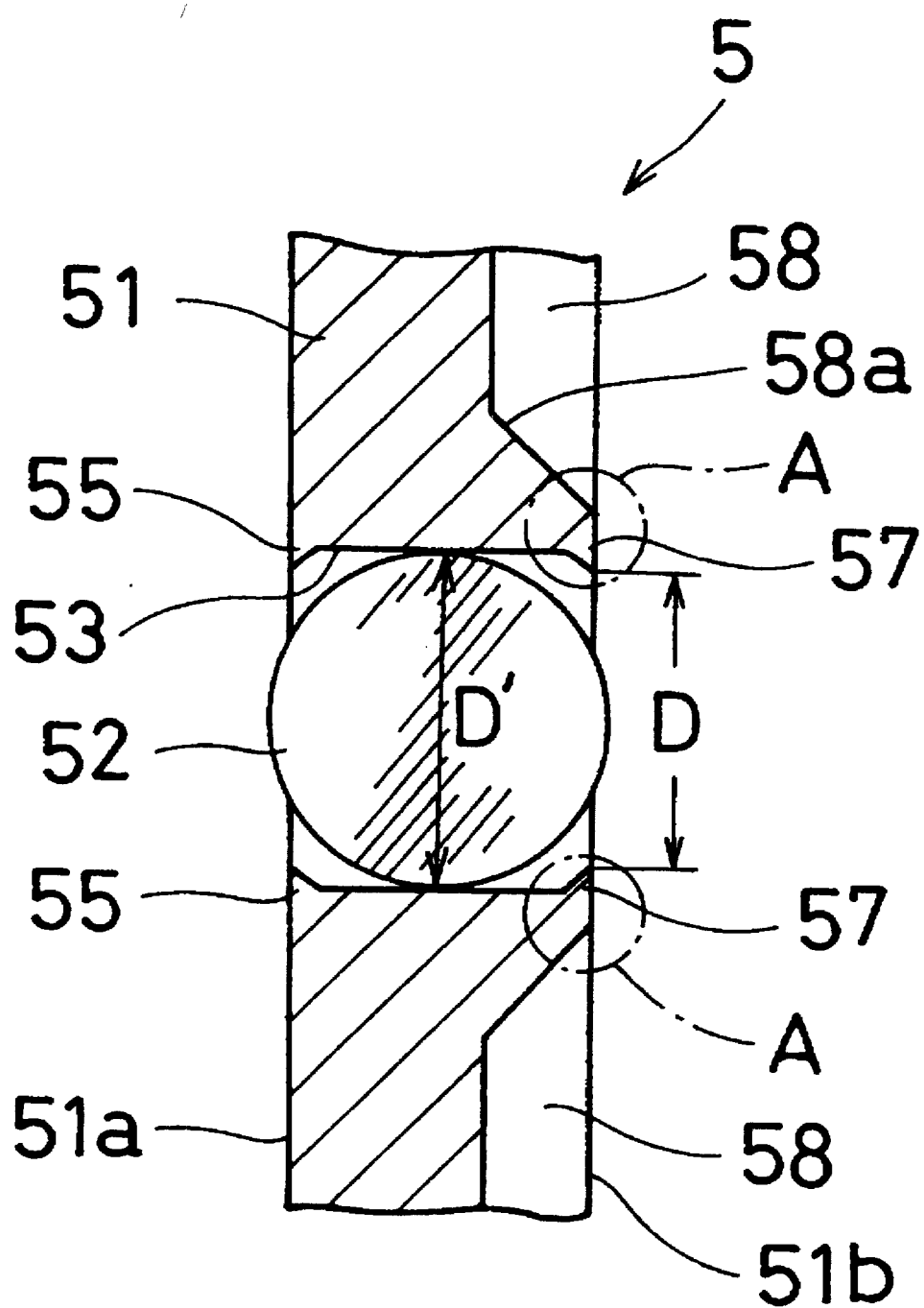
FIG. 6 is an enlarged view of a roller supporting hole of FIG. 5.

As shown in FIGS. 5 and 6, there are provided tongue-like portions 55 and 57 protruding inwardly from the edges of the supporting hole 53 on the inner and outer side surfaces 5a and 51b. These tongue-like portions 55 and 57 prevent the roller 52 from dropping out of the supporting hole 53 and maintain the roller 52 in the supporting hole 53.

Turning back to FIG. 3, there are provided cavities 58 between the adjacent holes 53 on each flat portion 51c of the retainer 51.

As shown in FIGS. 5 and 6, each cavity 58 has a trapezoid shape in cross section and the aperture of each cavity 58 becomes larger as it approaches the outer side surface 51b of the retainer 51. The tips of the inclined surfaces 58a of each cavity 58 are disposed in the vicinity of the tongue-like portions 57. As shown in FIG. 6, the edge portion A including the tongue-like portion 57 can elastically deform toward the cavity 58 such that the aperture D of the supporting hole 53 on the outer side surface 51b of the retainer 51 will be enlarged.

The cavity 58 is not limited to the trapezoid shape. Any shape may be used which allows the edge portion A to elastically deform toward the cavity 58. In addition, the cavity 58 may be a penetrating hole which penetrates to the inner side surface 51a of the retainer 51.

Figure 7:
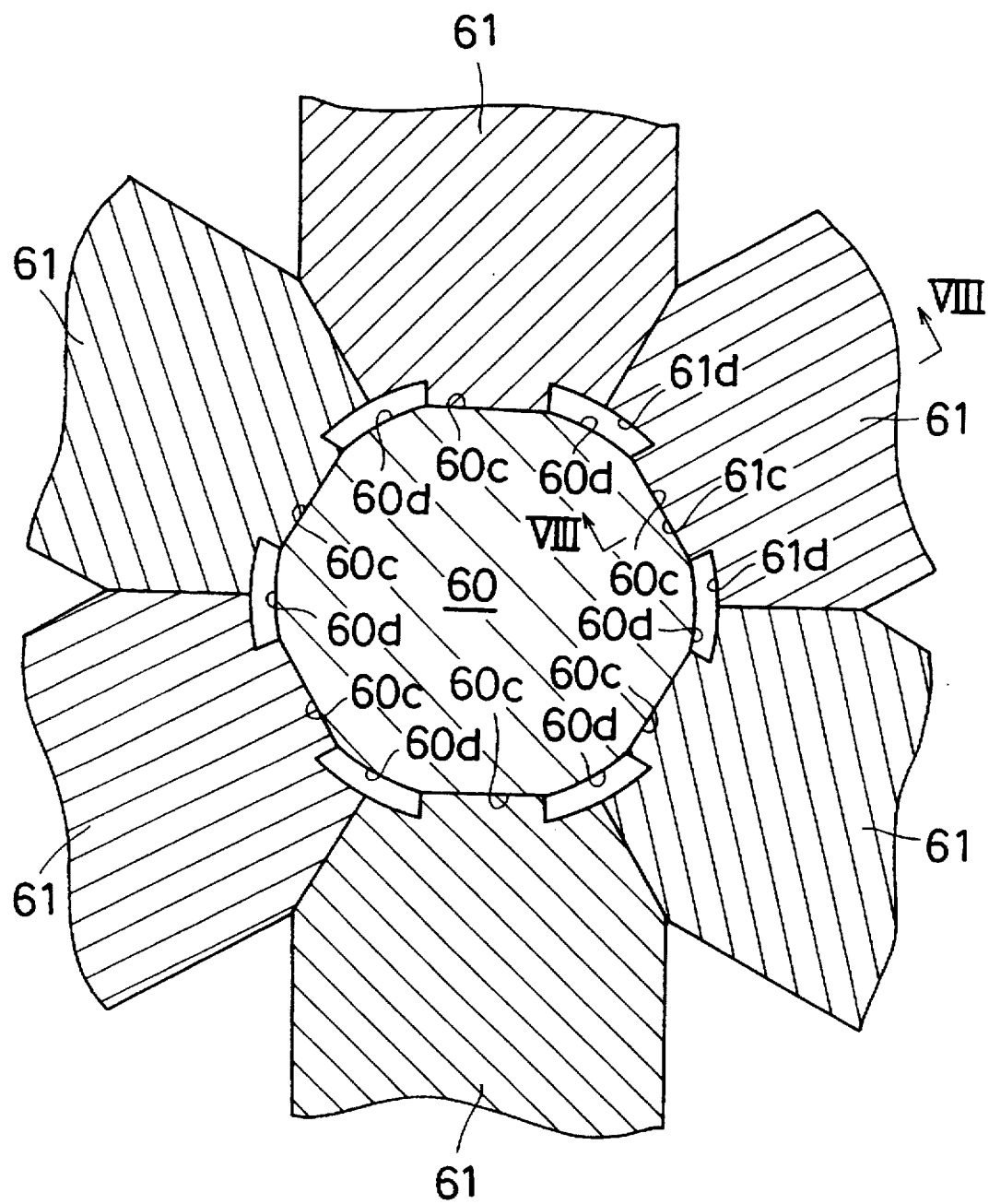
FIG. 7 is a top sectional view illustrating the arrangement of a resin mold set when molding a bearing retainer of the present invention by injection molding.
Figure 8:
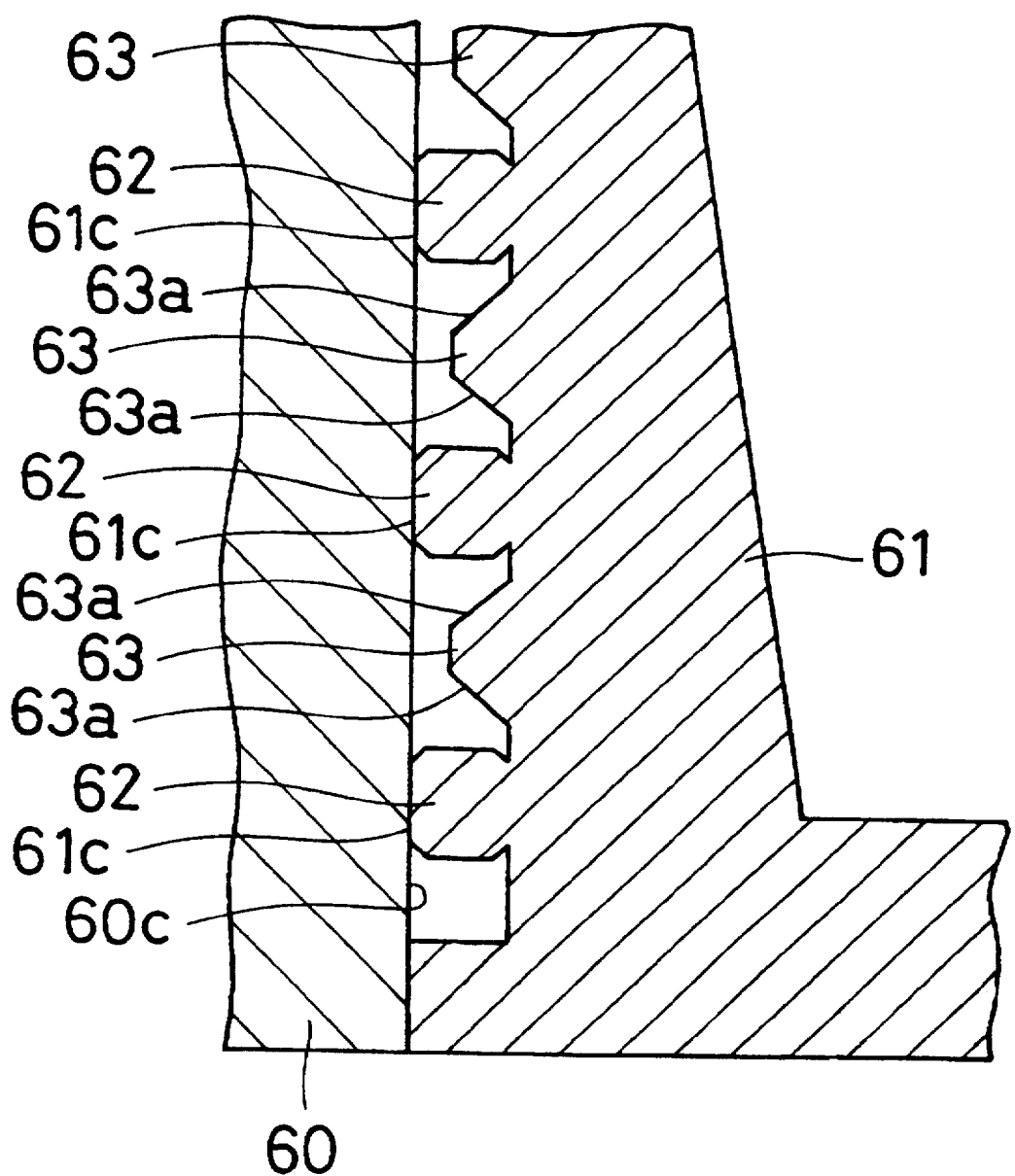
FIG. 8 is a sectional view of a resin mold set of FIG. 7 taken along line VIII—VIII.
Figure 9:
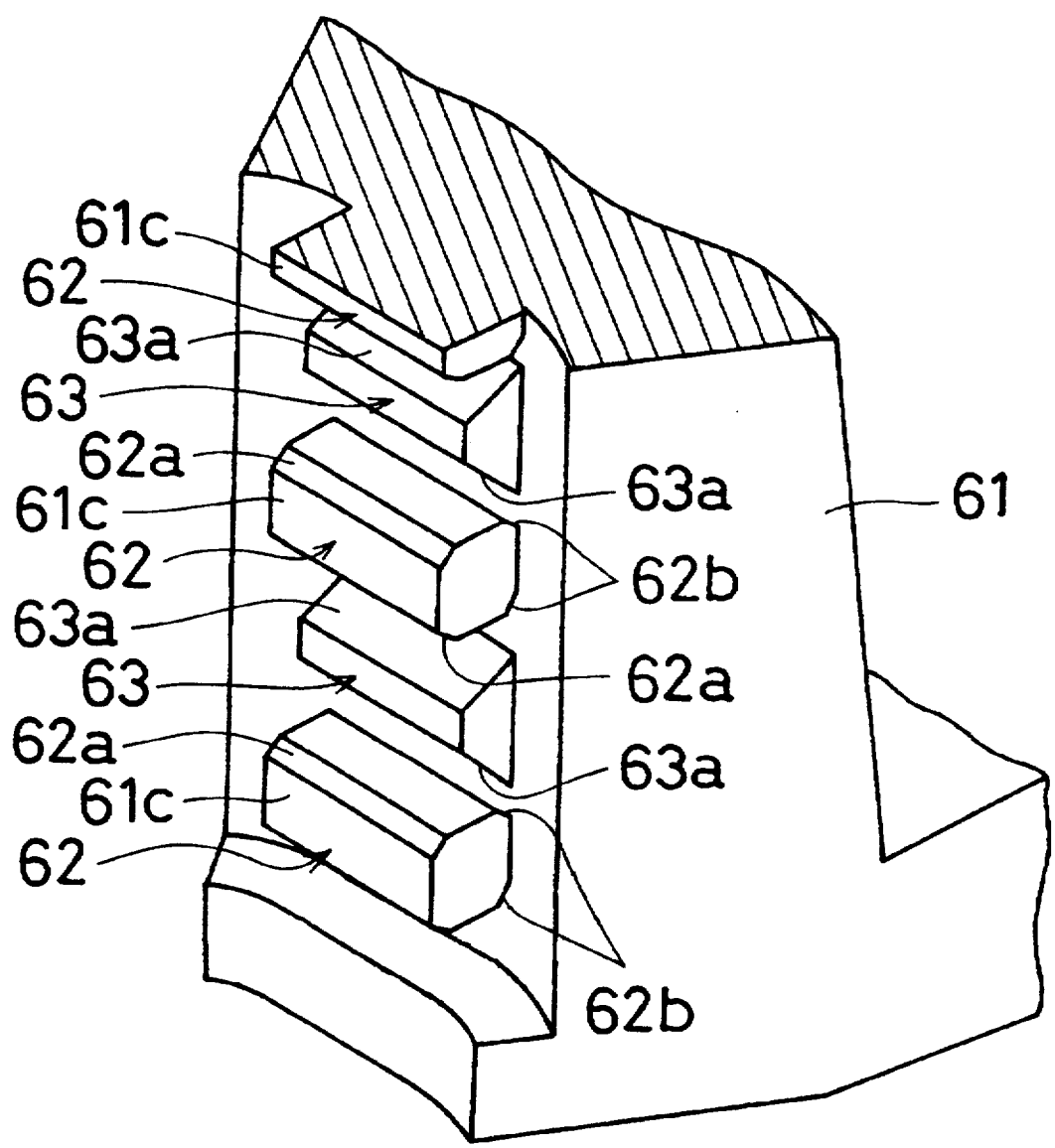
FIG. 9 is a perspective view of a portion of an outer mold constituting a resin mold set.

FIGS. 7 to 9 illustrate a resin mold set to mold the retainer 51 by injection molding. FIG. 7 is a top sectional view illustrating the arrangement of the resin mold set when forming the bearing retainer 51. This resin mold set includes an inner mold 60 and outer molds 61 which are placed around the inner mold 60 and divided into six portions.

The inner mold 60 has six flat portions 60c extending longitudinally (or perpendicularly to the page of FIG. 7) on the outer side surface thereof. Adjacent flat portions 60c are connected by a curved or flat portion 60d which also extends longitudinally.

Each outer mold 61 has the same structure. The outer mold 61 includes flat portions 61c to be contacted with the corresponding flat portion 60c of the inner mold 60 and longitudinally extending curved or flat portions 61d disposed at the both sides of the flat portions 61c. Each curved or flat portion 61d of the outer mold 61 forms a continuous curved or flat face with the adjacent curved or flat portion 61d of the adjacent outer mold 61.

As shown in FIGS. 8 and 9, the outer mold 61 includes a plurality of first protrusions 62 disposed longitudinally, each of which has a generally rectangular shape in cross section. The outer mold 61 also includes a plurality of second protrusions 63 which are disposed between the first protrusions 62 and trapezoid in cross section.

The first protrusion 62 is provided for forming the supporting hole 53 of the retainer 51. The flat surface 61c of the first protrusion 62 contact the flat portion 60c of the inner mold 60. The inclined surfaces 62a and 62b are formed at the corners of the first protrusion 62.

The second protrusion 63 is provided for forming the cavity 58 of the retainer 51. The second protrusion 63 has inclined surfaces 63a and the flat surface of the second protrusion 63 is disposed spaced apart from the flat portion 60c of the inner mold 60.

Necessary procedures for molding the retainer 51 are as follows. First, heated and plasticized melting resin is injected into the resin mold set. After that, injected resin will be cooled and cured by cooling the resin mold set.

Figure 10:
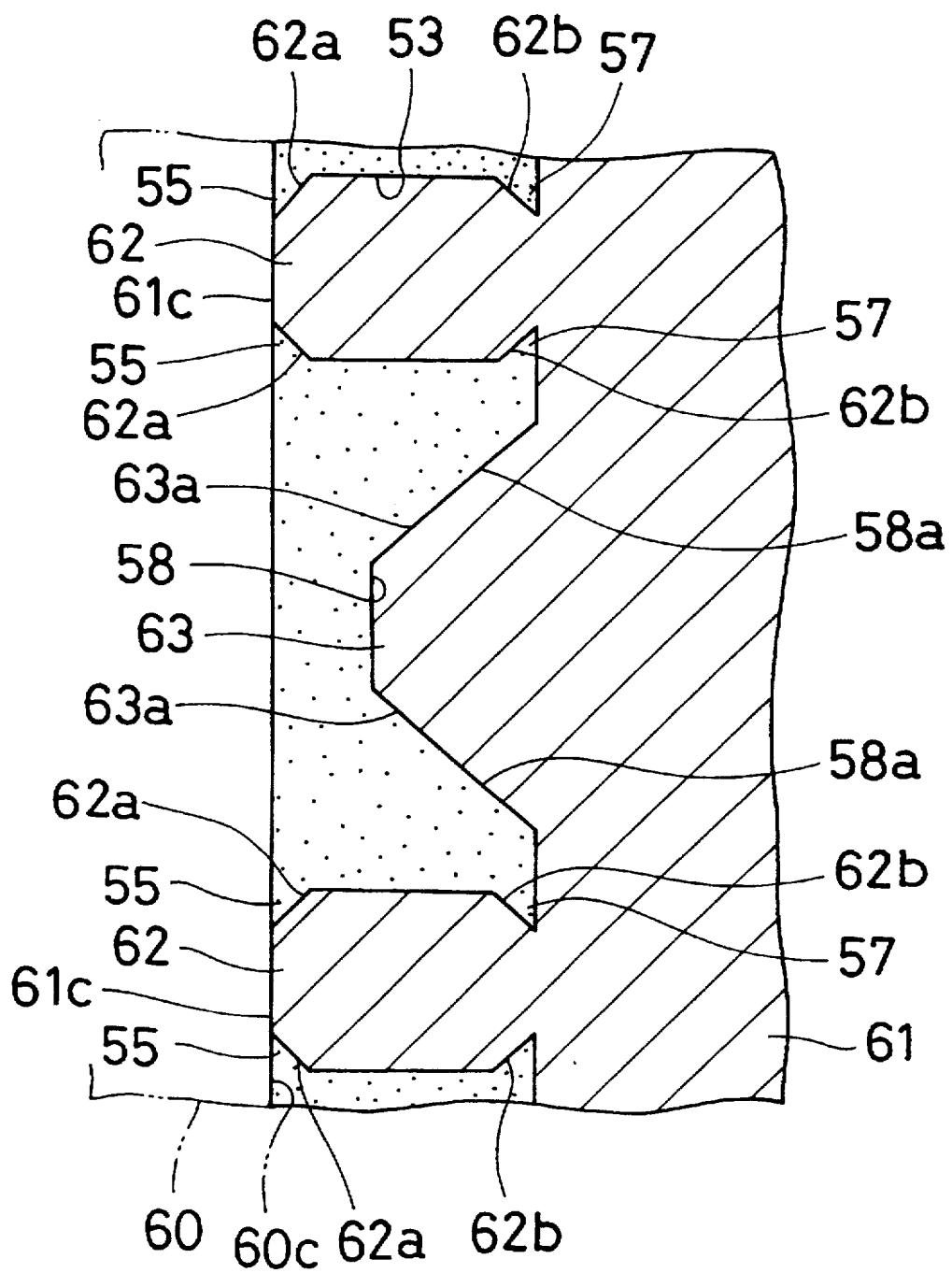
FIG. 10 is an enlarged view of a portion of the interior of a resin mold set after resin injection.

FIG. 10 illustrates the interior of the resin mold set after the injected resin has been cured. As shown in FIG. 10, the injected resin around the inclined surfaces 62a and 62b of the first protrusion 62 forms the equivalent portions to tongue-like portions 55 and 57 of the retainer 51. The injected resin at the inclined surfaces 63a forms the equivalent portions to the inclined surface 58a of the retainer 51.

Secondly, when each outer mold 61 has moved away from the inner mold 60 the resin mold product (or the retainer 51) will be obtained. At the time of moving of the outer mold 61 the inclined surface 62b of the first protrusion 62 interferes with the tongue-like portion 57 because the inclined surface 62b is inclined in the direction opposite to the draft taper.

Figure 11:
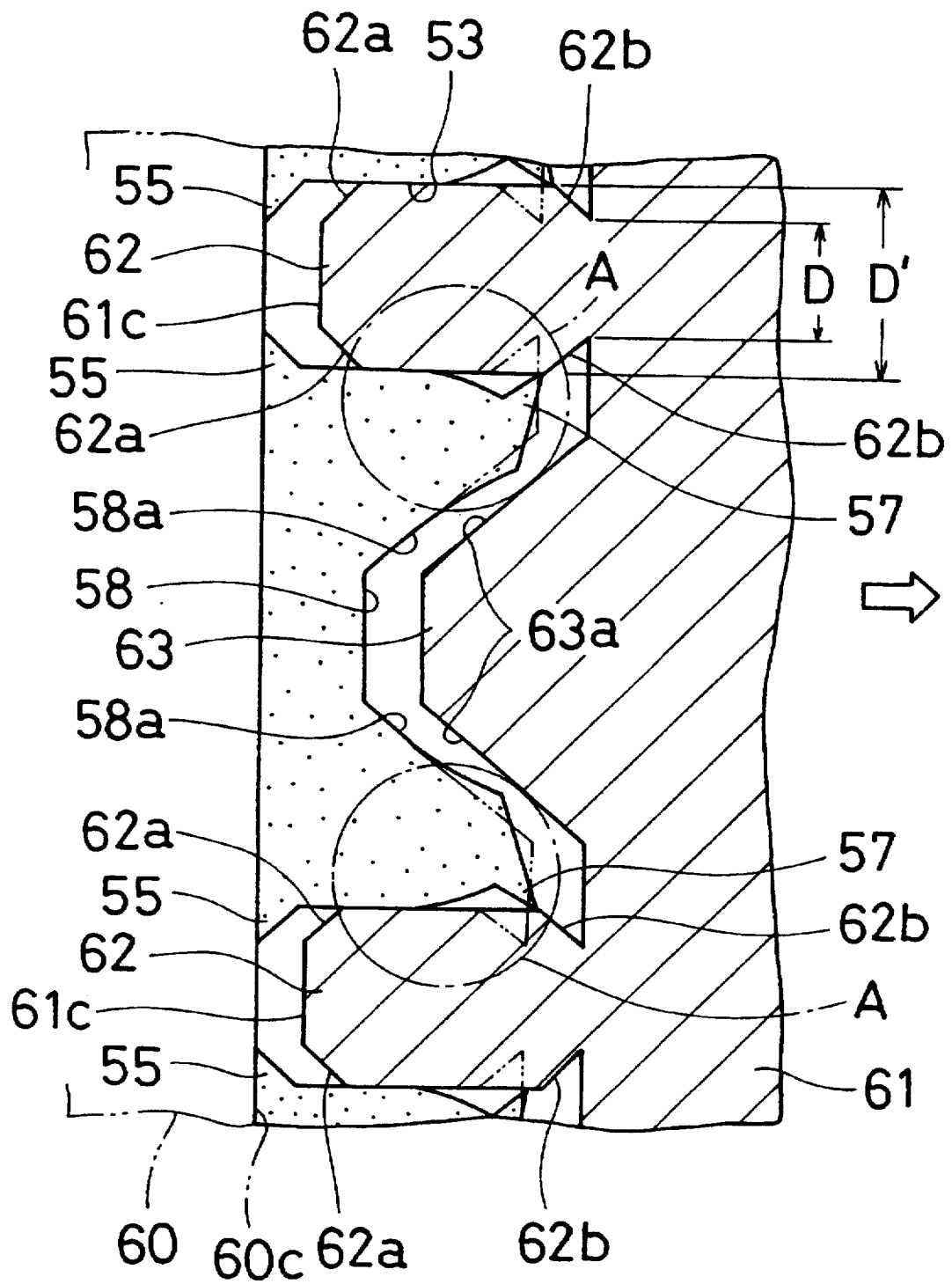
FIG. 11 is an enlarged view illustrating how the resin molded product (or a bearing retainer) deforms when an outer mold moves away from an inner mold.
Figure 12:
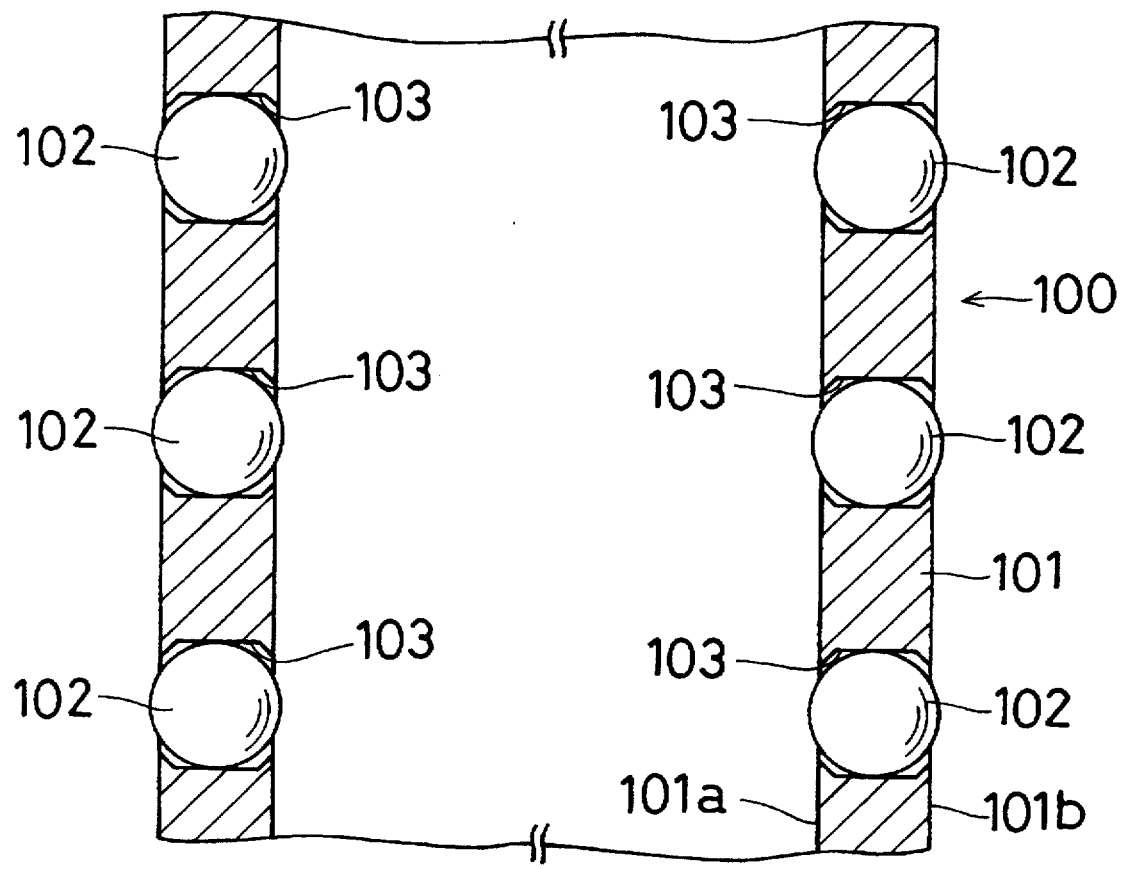
FIG. 12 is a side sectional view of a portion of a conventional bearing retainer.
Figure 13A:
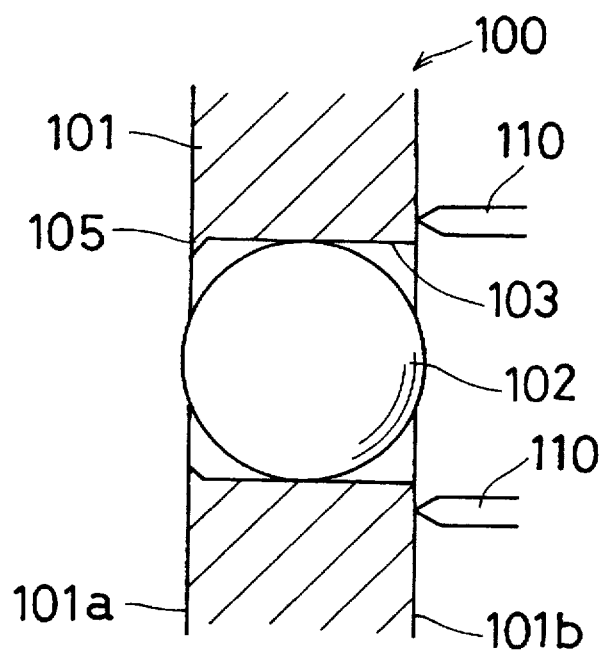
FIGS. 13A and 13B are side sectional views of a portion of a conventional bearing retainer, showing its manufacturing process.
Figure 13B:
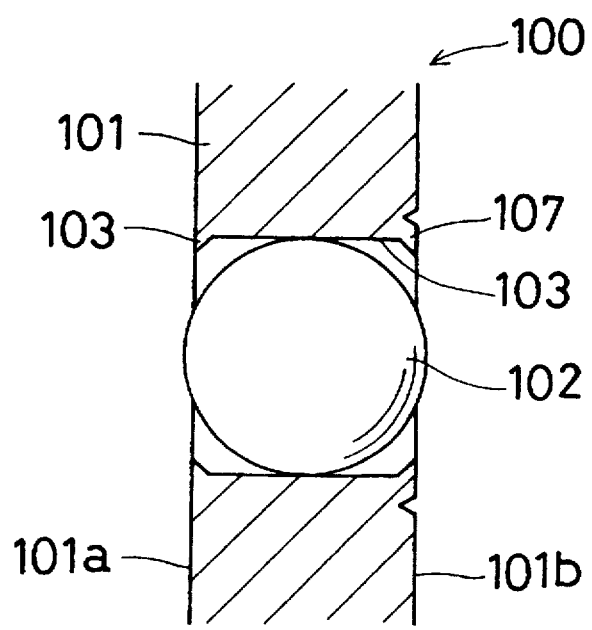

However, as shown in FIG. 11, as the outer mold 61 moves away from the inner mold 60 a gap between the inclined surfaces 63a of the second protrusion 63 and the inclined surfaces 58a of the cavity 58 gradually becomes larger. As a result of this gap, the edge portion A including the tongue-like portion 57 elastically deforms toward the cavity 58 and the aperture D of the supporting hole 53 will be enlarged to D'.

Thus, the first protrusion 62 can go through the supporting hole 53, and the outer mold 61 can move away from the inner mold 60 without cracking or breaking the tongue-like portion 57.

After the outer mold 61 has completely moved away from the inner mold 60 elastically deformed edge portion A returns to the original position (see FIG. 11) and the retainer 51 is obtained.

In this case, by providing the cavity 58 between the adjacent supporting holes 53 of the retainer 51, when the outer mold 61 has moved away from the inner mold 60 during the molding process of the retainer 51, the retainer 51 can be obtained without cracking or breaking the tongue-like portion 57.

In this way, the tongue-like portion 57 can be molded on the outer side surface 51b of the retainer 51 by injection molding. As a result of this, caulking process for forming the tongue-like portion 57 is not required and manufacturing cost can be reduced.

Then, by placing the rollers 52 into the supporting holes 53 of the retainer 51, the roller bearing 5 will be completed. When placing the rollers 52 into the holes 53 the rollers 52 are pressed from the outer side surface 51b into the aperture portion formed by adjacent tongue-like portions 57. Then, similarly to the molding process of the retainer 51, the edge portion A including the tongue-like portion 57 elastically deforms toward the cavity 58 and the aperture D of the supporting hole 53 will be enlarged to D'. This enables the rollers 52 to be easily placed into the holes 53.

In addition, when the assembled roller bearing 5 functions in the guide-post 2 each cavity 58 acts as a reservoir for lubricant (or oil). Thus, life of the guide-post 2 will be improved.

Each cavity 58 may be filled with fillings made up of foamed materials. In this case, since lubricant is securely kept in multiple holes inside the foamed materials each hole will securely function as a reservoir for lubricant and thus, life of the guide-post 2 will be further improved.

Alternatively, the retainer 51 itself may be formed of foamed resin. In this case, lubricant is kept in each portion of the retainer 51 and thus, life of the guide-post 2 will be still further improved.

In the above-mentioned preferred embodiment, the present invention is applied to the guide-post of the die-set but this invention is not limited to the guide-post.

As shown in FIG. 1, the bearing retainer of the present invention can be applied to a sliding mechanism 250 which slidably supports the ram 204 of the press 200 in the longitudinal direction.

In FIG. 1, the sliding mechanism 250 includes a longitudinally extending post 252, a sleeve 254 slidably received outside the post 252 and a bearing 256 inserted between the post 252 and the sleeve 254.

The upper portion of the post 252 is fixed on the bottom surface of the ram 204 and the lower portion of the sleeve 254 is fixed on the bed 202. That is to say, in this embodiment, the position of the post and sleeve is upside down, differently from the die-set 1.

Similarly to the above-mentioned embodiment, the outside portion of the post 252 has a plurality of flat portions each of which extends longitudinally and the post 252 has a generally polygonal shape in cross section. The bearing 256 includes a retainer having a tubular configuration (or polygonal shape in cross section) and a plurality of needle-like rollers supported in the retainer. The retainer is formed using the same molding process as that of the previous embodiment shown in FIGS. 7–10 and the retainer includes cavities formed between the adjacent supporting holes and tongue-like portions formed at the edge portions of the supporting holes.

In the above-mentioned embodiments, the present invention is applied to the press, but this invention can also be applied to the bearing retainer for a sliding mechanism of other machine tools than a press.

Those skilled in the art to which the invention pertains may make modifications and other embodiments employing the principles of this invention without departing from its spirit or essential characteristics, particularly upon considering the foregoing teachings. The described embodiments are to be considered in all respects only as illustrative and not restrictive and the scope of the invention is, therefore, indicated by the appended claims rather than by the foregoing description. Consequently, while the invention has been described with reference to particular embodiments modifications of structure, sequence, materials and the like would be apparent to those skilled in the art, yet still fall within the scope of invention.

What is claimed is:

1. A bearing retainer for a sliding mechanism for use in a machine tool comprising a tubular retainer body having a plurality of flat portions each of which extends longitudinally, a plurality of supporting holes formed in said flat portions for rotatably supporting a plurality of rollers, said supporting holes having tongue-like portions at the edge portions thereof for preventing rollers from dropping out therefrom, a plurality of cavities formed between said adjacent supporting holes on each of said flat portions, said cavities being adapted to allow said edge portions including tongue-like portions to elastically deform in the direction that the apertures of said supporting holes become greater on the outer side surface of said retainer body.

2. The bearing retainer of claim 1, wherein said cavities are trapezoid in cross sections and the apertures of said cavities become greater as they approach the outer side surface of said retainer body.

3. The bearing retainer of claim 1, wherein said sliding mechanism is a guide-post for a die-set for use in a press.

4. The bearing retainer of claim 1, wherein said retainer is formed of foamed resin.

5. The bearing retainer of claim 1, wherein said cavities are filled with fillings made up of foamed materials.

* * * * *